United States Patent
Kucera

[15] 3,668,064
[45] June 6, 1972

[54] COMPOSITION BOARD AND METHOD OF MAKING IT

[72] Inventor: Leonard J. Kucera, Box 82 Rogers Route, International Falls, Minn. 56649

[22] Filed: Jan. 28, 1970

[21] Appl. No.: 6,590

[52] U.S. Cl.................................162/171, 162/180, 162/225
[51] Int. Cl..........................................D21h 3/00, D21h 3/06
[58] Field of Search....................................162/171, 180, 225

[56] References Cited

UNITED STATES PATENTS

| | | | |
|---|---|---|---|
| 3,113,065 | 12/1963 | Newton et al. | 162/225 X |
| 2,538,926 | 1/1951 | Sutherland | 162/171 |
| 2,493,507 | 1/1950 | Sutherland | 162/171 X |
| 1,862,688 | 6/1932 | Loetscher | 162/225 |
| 3,002,878 | 10/1961 | Linzell et al. | 162/225 X |

*Primary Examiner*—Howard R. Caine
*Attorney*—H. F. Woodward

[57] ABSTRACT

This invention relates to a structural composition board and method of making it. The board is made from finely divided ligno-cellulose material and pulverized additives such as asphaltites and pulverized pine wood pitch. The pulverized material or materials are intimately mixed with the finely divided ligno-cellulose material in a liquid suspension. A board-like product is formed from the liquid suspension of ligno-cellulose and pulverized material; the board-like product is dried; dried board is subjected to pressure to consolidate and bond the board-like product while internal heat is above the softening point of the pulverized material in the board-like product. At least about 5 percent of the asphaltites is employed in the board-like product.

8 Claims, No Drawings

COMPOSITION BOARD AND METHOD OF MAKING IT

This invention relates to production of an improved composition board of sufficient durability and strength for use in various capacities and particularly suitable for structural use.

This invention also relates to what is known in the construction industry as hot pressed products and, in particular, as sheet lumber. This invention has particular reference to a method of manufacturing sheet products from lignocellulose material, finely divided, and incorporated additives by forming such material into layers or pads that are compressed and bonded together under action of heat and pressure such as might be obtained, for example, by subjecting the sheet or pad to compression in a heated platen press.

The present method anticipates that ligno-cellulose material may be finely divided by any suitable method as long as all or substantially all the lignin is retained. The wood or woody material may be reduced to a finely divided state in any suitable manner, such as grinding, explosion and what is known as semi-chemical processes.

In the invention there is employed finely divided ligno-cellulose having distributed therethrough asphaltites in combination with pine wood pitch. The asphaltites and pine wood pitch when properly combined with ligno-cellulose material and consolidated under pressure and heat, result in products of considerable resistance to the absorption of moisture and warping thereby reducing surface oxidation (age deterioration) and which together with a pleasant appearance, have desirable structural properties, particularly in respect to rigidity and resistance to breakage and products that may be coated without the additives, such as asphaltites, discoloring and coating material.

With the foregoing and other objects in view, the invention consists of the novel steps and combination of steps hereinafter more specifically described. It being understood that changes, variations and modifications may be resorted to which fall within the scope of the claims hereto appended.

In the specification and claims:
- Pine wood pitch or resin — a hydrocarbon insoluble fraction of a coal tar hydrocarbon extracted from pine wood low in abietic acid.
- Asphaltites — a natural bituminous mixture differing from asphalt in that the non-mineral constituents are difficulty fusible and largely soluble in carbon bisulfide.
- Size — wax, resin or a combination thereof.
- Stock — Pulp or a water suspension of finely divided ligno-cellulose material.
- Additives — asphaltites alone and in combination with pine wood pitch.
- Chest — a container in which agitation is provided, and from which the the stock is directed to a board forming device.
- Internal Board Temperature — a temperature above the softening point of the additives used.

The invention in particular comprehends a series of steps in which asphaltites and pine wood pitch or resin are incorporated by suitable means, such as a refiner, beater or mixer with finely divided ligno-cellulose material as to permit formation of sheets of substantial thickness in a continuous manner. Asphaltites and pine wood pitch are combined with the stock in a refiner or equivalent device in such manner as to distribute the additives substantially uniformly through the stock. The stock containing the additives is formed into board-like products.

The asphaltites to be used are those having a softening point about 270° F. to about 400° F. and include Gilsonite (Uinlaite), Glance pitch and Grahamite.

The pine wood pitch is obtained by extraction of pine wood and contains oxidized resin, oxidized abietic acid, oxidized terpenes, phyphenols, Polymerized terpenes. These resins are more fully described in U.S. Pat. No. 2,060,856 issued to John M. DeBell. Pine wood pitch resins that are preferred comprise a residue, low in abietic acid, remaining after the separation of refined resins, high in abietic acid, from resinous material.

The pine wood resin and the asphaltites are finely pulverized before being added to the fibrous pulp slurry.

In accordance with the invention, fibrous pulp in a pumpable slurry have added thereto pulverized additives. For example, the asphaltites and pine wood resin or asphaltites alone as received from a wetted micropulverizer is added to the pulp slurry. After the pulverized asphaltites plus pine wood resin or pulverized asphaltites alone are added to the pumpable stock, it is preferred that the stock and additives mixture be passed through a suitable refiner or equivalent. Generally a suitable sizing material is added before the stock containing the additives goes to the refiner. The stock from the refiner is usually directed to a container, such as a chest, from which the slurry containing the added materials is pumped to a suitable board forming machine. In the preferred method the consistency of the slurry is adjusted and alum or its equivalent is added thereto. The thickness of the formed board depends upon the desired thickness of end product. The wet formed boards are passed through a suitable drier or kiln to reduce the moisture contents to about 2 to about 5 percent. The dried boards are cut to a size suitable for a hot platen press. A multiple open heated platen hydraulic press is preferred, although other types of hot pressing devices may be used. The temperature of the press platen is of such a temperature as to raise the internal temperature of the board to about 380° F. to about 440° F. depending upon the desired quality. The temperature of the press platen may vary considerably as the internal temperature of the board is the controlling factor. Of course, the moisture content of the board and temperature of the board going to the press must be taken into consideration in determining the proper time the board is subjected to heat and pressure.

The following is an example of making an exterior covering product, such as siding, having a density of about 30 to 36 pounds per cubic foot and a thickness of about seven-sixteenths inch; add asphaltites and pine wood pitch to a water suspension of ground wood pulp; forming a board-like product; drying board-like product; hot pressing board-like product; cooling pressed board and humidifying cooled board.

The pulverized asphaltites are screened to remove any lumps that might be in the pulverized material. The additives, either in a water slurry or powdered form, are injected into the stock at a place where they will be intimately mixed with the stock.

The amount of additives giving the best results and improved board-like product is about 16 to 22 percent. The product can be painted without any bleeding of the additives into the paint.

The additives and size used may fall within the following range:

| | |
|---|---|
| Asphaltites | 5% to 22% |
| Pine wood pitch | 0% to 17% |
| Sizing | 1% to 2% |

(The percentages above set forth are based upon the dry weight of the ligno-cellulose fibers in the board-like product.)

After board is formed and dried, the following method may be used: Dried board weighing about 1,150 to about 1,350 pounds per thousand (1,000) surface feet and having a thickness of about twenty-six thirty-seconds inch, is cut to about press opening size; coat board with release agent to lessen sticking to pressing surfaces; board pressed to stops of about seven-sixteenths inch (the desired thickness of finished product); pressing time about 4 to about 10 minutes with pressing surfaces heated to a temperature of about 475° F. to about 480° F. (The pressing surfaces heated to about these temperatures provides an internal temperature of about 380° F. to about 440° F. in the above given time.) Pressed board cooled; and preferably humidified.

Preheating the board before pressing to about 250° F. to about 280° F. reduces the pressing time about one-half. The surface contour of the pressed product being similar to the pressing surface.

The improved board is simple and easy to produce, can be produced at very low cost from any ligno-cellulose material, is tough and durable in use, and admirably adapted for home siding.

I claim:

1. A method of producing a low cost hot pressed composition board which is tough and durable in use, adapted for home siding application and which may be painted without bleeding the additives to the paint, comprising intimately dispersing additives pulverized in a pumpable slurry of finely divided ligno-cellulose material, forming a board-like product, drying the product to reduce the moisture content to about 2 percent to about 5 percent by weight, subjecting the dry product to pressure while heated to an internal temperature of about 380° F. to about 440° F. for about 4 minutes to about 10 minutes to produce a product having a density from about 30 to about 36 pounds per cubic foot; said additives consisting essentially of (1) asphaltites having non-mineral constituents which are difficulty fusible and largely soluble in carbon bisulfide, (2) pine wood pitch comprising a hydrocarbon insoluble fraction of a coal tar hydrocarbon extracted from pine wood low in abietic acid and (3) a sizing compound selected from a group consisting of wax and resin and combinations thereof, the proportions of the additives used falling within the following range by weight based on the dry weight of the ligno-cellulose fibers of the board like product:

| | |
|---|---|
| Asphaltites: | about 5% to about 22% |
| Pine wood pitch: | 0% to about 17% |
| Sizing | about 1% to about 2%. |

2. The method defined in claim 1 in which the additives have a softening point of about 270° F. to about 400 ° F.

3. The method defined in claim 2 in which the additives comprise 16 to 22 percent.

4. The method as defined in claim 1 in which the additives comprise asphaltites and pine wood resin.

5. The method as defined in claim 2 in which the additives are pulverized in a wetted micropulverizer and a pumpable slurry containing the additives are subjected to refiner action.

6. The method as defined in claim 1 in which the additives have a softening point of about 270° F. to about 400° F. and the dried board is preheated to about 250° F. to about 280° F.

7. The method as defined in claim 1 in which the additives have a softening point of about 270° F. to about 400° F. and include at least about 5 percent of Gilsonite.

8. A hot pressed composition board which is tough and durable in use, adapted for home siding application and which may be painted without bleeding the additives to the paint, having a density of about 30 pounds to about 36 pounds per cubic foot and composed of finely divided ligno-cellulose material and pulverized additives intimately dispersed throughout the ligno-cellulose produced in accordance with the process of claim 1.

* * * * *